United States Patent [19]

Kageyama et al.

[11] Patent Number: 5,216,505
[45] Date of Patent: Jun. 1, 1993

[54] SCANNING LINE INTERPOLATION CIRCUIT

[75] Inventors: Masahiro Kageyama, Kokubunji; Norihiro Suzuki, Tokorozawa; Kazuo Ishikura, Kanagawa; Makoto Ohnishi; Hiroshi Yoshigi, both of Tokyo; Takahiko Fukinuki, Kokubunji, all of Japan

[73] Assignee: Hitachi, Ltd., Tokyo, Japan

[21] Appl. No.: 565,977

[22] Filed: Aug. 13, 1990

[30] Foreign Application Priority Data

Aug. 16, 1989 [JP] Japan .................. 1-210072
Jan. 19, 1990 [JP] Japan .................. 2-008241

[51] Int. Cl.⁵ ............................................ H04N 7/04
[52] U.S. Cl. ................................ 358/141; 358/142; 358/12
[58] Field of Search ............... 358/133, 140, 141, 11, 358/12, 105, 22

[56] References Cited

U.S. PATENT DOCUMENTS

| 4,672,445 | 6/1987 | Casey et al. ................. 358/11 |
| 4,677,483 | 6/1987 | Dischert et al. .............. 358/11 |
| 4,745,459 | 5/1988 | Ninomiya et al. ............. 358/12 |
| 4,884,127 | 11/1989 | Isnardi et al. ............... 358/142 |
| 4,885,631 | 12/1989 | Fukinnki et al. .............. 358/105 |

Primary Examiner—James J. Groody
Assistant Examiner—Michael H. Lee
Attorney, Agent, or Firm—Antonelli, Terry, Stout & Kraus

[57] ABSTRACT

A scanning line interpolation circuit for reproducing scanning lines not transmitted through interpolation on the basis of a main scanning line signal and an auxiliary signal both transmitted, wherein an interpolated scanning line signal is generated on the basis of the main scanning line signal and auxiliary signal with respect to a frequency band used to transmit the auxiliary signal and an interpolated scanning line is generated in response to picture motion on the basis of only the main scanning line signal with respect to a frequency band used not to transmit the auxiliary signal.

7 Claims, 8 Drawing Sheets

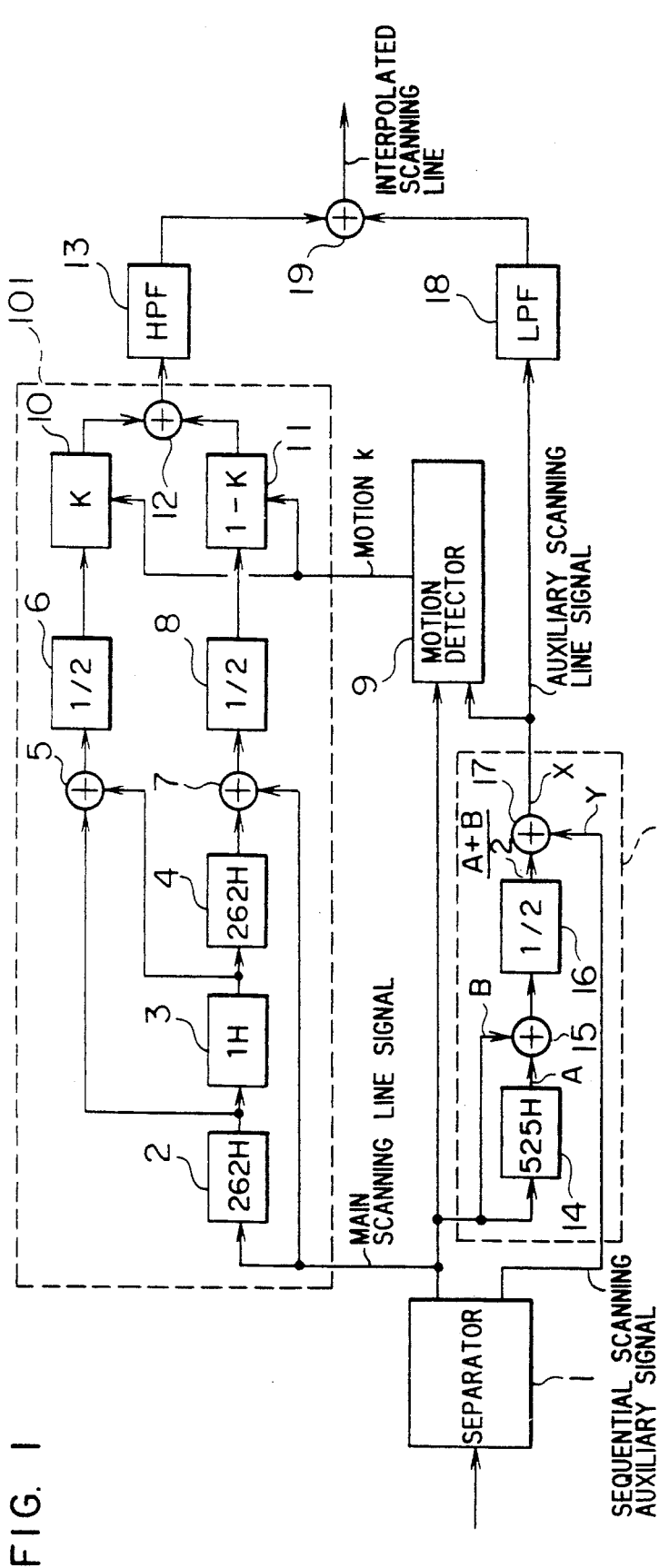
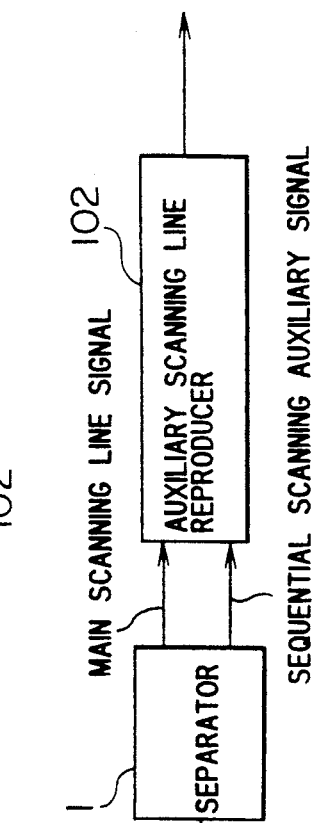
FIG. 1
FIG. 2 PRIOR ART

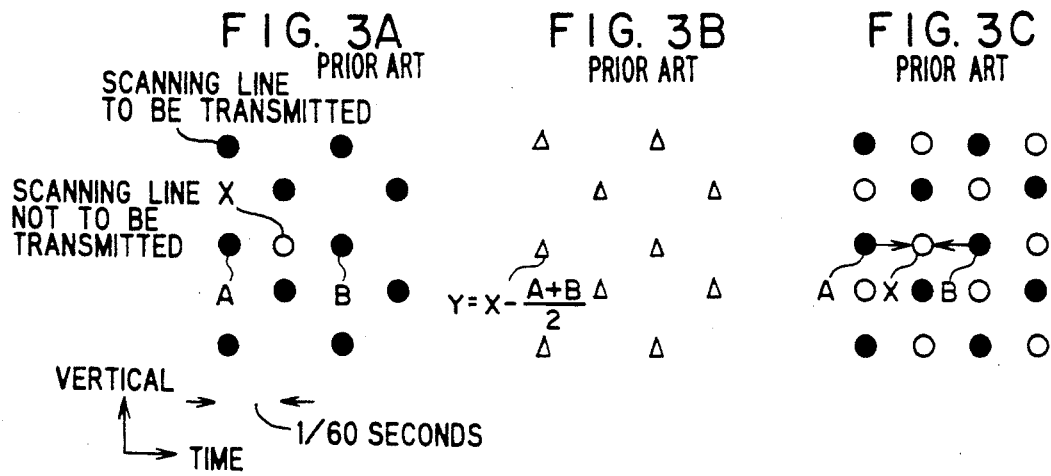
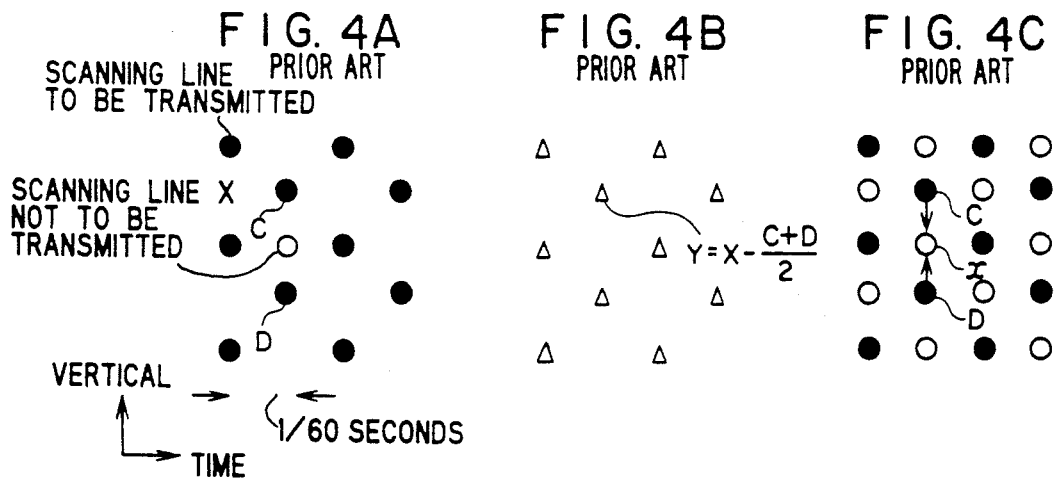
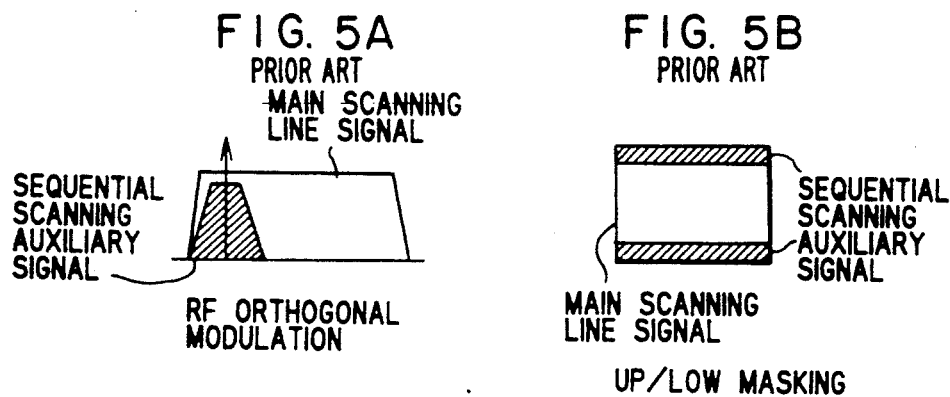

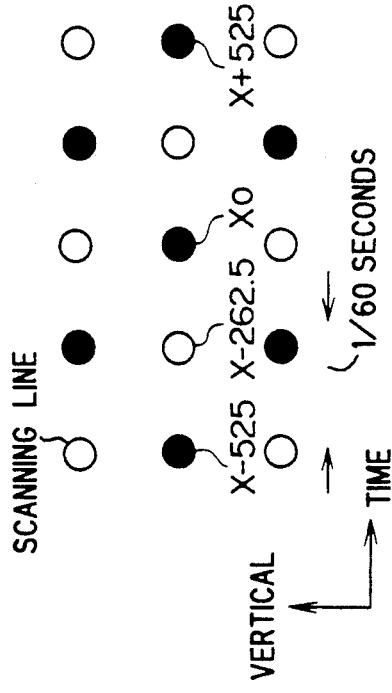
FIG. 7
FIG. 8
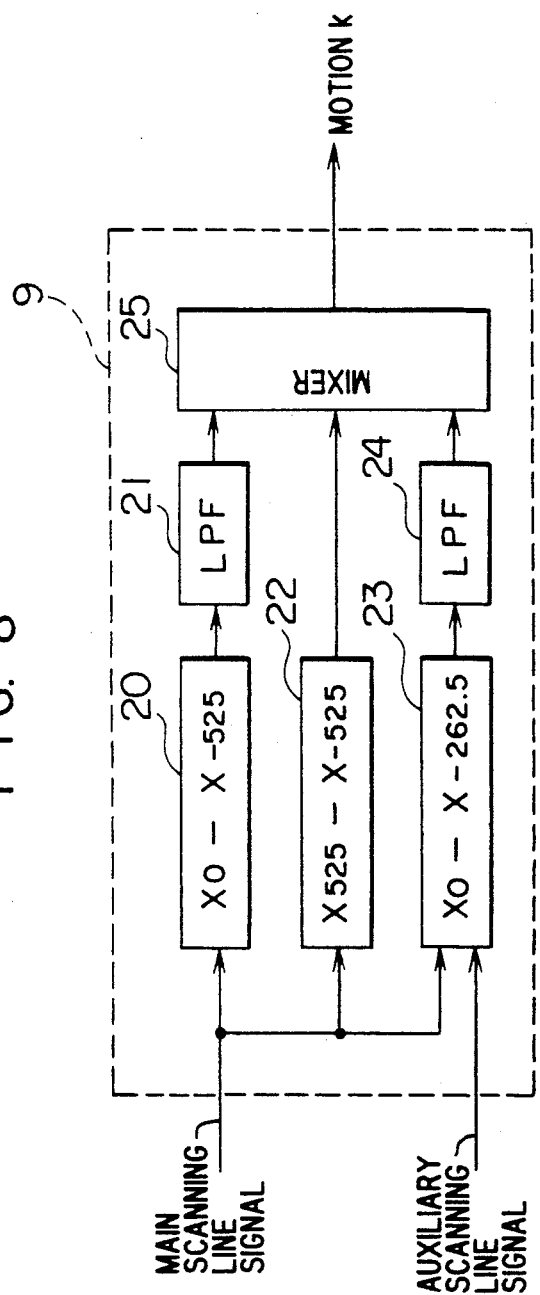

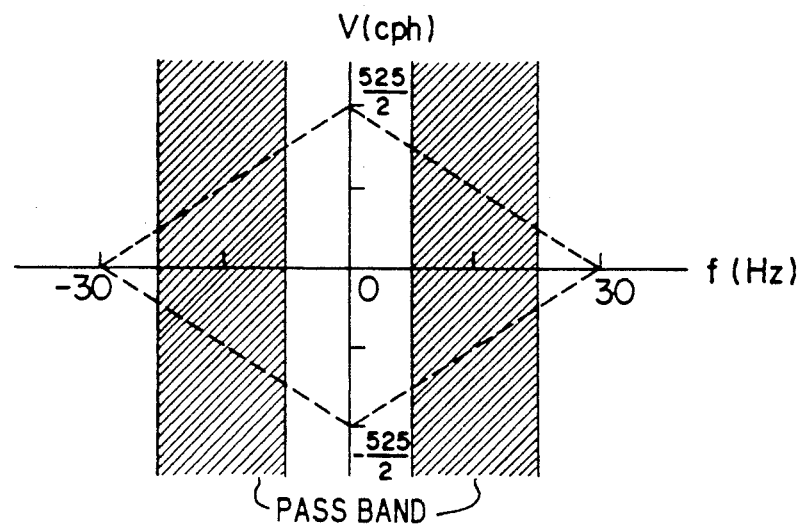
ONE FRAME DIFFERENCE $F_1 = X_0 - X_{-525}$
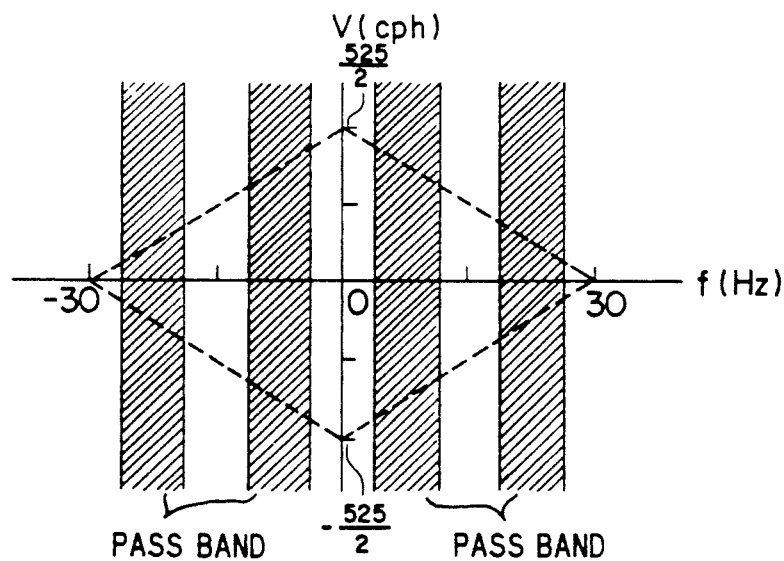
TWO-FRAME DIFFERENCE $F_2 = X_{525} - X_{-525}$ ONE FIELD DIFFERENCE $f_1 = X_0 - X_{-262.5}$

SCANNING LINE INTERPOLATION CIRCUIT

BACKGROUND OF THE INVENTION

The present invention generally relates to scanning line interpolation circuits and, more particularly, to a scanning line interpolation circuit wherein a frequency band of a sequential scanning auxiliary signal (V-T helper signal) is limited at the transmitter side and interlaced scanning lines not transmitted are reproduced by interpolation on the basis of television signals including the sequential scanning auxiliary signal and a main signal which are both transmitted.

In an existing television system (in an NTSC system), a picture is transmitted with one frame divided into two fields by interlaced scanning. A conventional TV receiver has had such a problem that, since display is carried out based on interlaced scanning, the roughness or flickering of a reproduced picture caused by every line scanning results in deterioration of the picture.

In an attempt to reduce the deterioration of the picture quality, there have been suggested an EDTV system which maintains full compatibility with an existing television system and an IDTV system in which an existing television signal is processed or subjected to an interlace-to-sequential-scanning conversion at the receiver side to provide highly fine display. In the latter case, a motion in a picture image is detected and scanning-line interpolation processing is performed on the basis of a processing parameter indicative of the detected motion (for example, refer to JP-A-58-130685).

Since the transmitted signal is an interlace signal, however, this method is restricted, and it is in principle, impossible to detect some motion. For example, since the system cannot distinguish a picture moving at a speed just equal to a frame period (1/30 seconds) from a still picture, the system performs an interpolation processing over the actually moving picture in a still picture mode, thus resulting in picture quality being remarkably deteriorated. Further, in a part judged as a moving picture, since a scanning line which is not transmitted is generated by interpolating upper and lower scanning lines in an identical field, the system disadvantageously cannot reproduce a picture having a high vertical frequency (e.g., fine horizontal streak).

For the purpose of avoiding the above disadvantage, there has been considered a system that an ordinary transmission signal (which will be abbreviated to the main scanning line signal, hereinafter) is generated through sequential-to-interlace scanning conversion with use of a sequential scanning camera on the transmitter side, and a signal (which will be abbreviated to the sequential scanning auxiliary signal, hereinafter) for assisting the scanning line interpolation at the receiver side is transmitted together with the sequential scanning auxiliary signal from the transmitter side to the receiver side. In an advanced compatible TV (ACTV) system suggested by the David Sarnoff Research Center) DSR in the U.S., for example, a difference signal (field difference signal) corresponding to a difference between a scanning line of a first field not transmitted due to interlaced scanning and a scanning line at the corresponding position in a field before or after the first field by one field is transmitted as a sequential scanning auxiliary signal (V-T helper signal).

Referring to FIG. 2, there is schematically shown an exemplary arrangement of a scanning line auxiliary circuit used in the prior art ACTV receiver (as disclosed in IEEE Transactions on Consumer Electronics. Vol. 34, No. 1, Feb. 1988), wherein an input signal transmitted on a multiplex basis is separated at a separator 1 into a main scanning line signal (interlace signal) and a sequential scanning auxiliary signal (V-T helper signal) and then subjected at an auxiliary scanning line reproducer 102 to an interpolation to reproduce a scanning line not transmitted. FIGS. 3A to 3C illustrate how to reproduce a scanning line not transmitted. More specifically, FIG. 3A illustrates a positional relation between main scanning line signals to be transmitted and FIG. 3B shows a positional relation between sequential scanning auxiliary signals. In FIG. 3A, reference symbols A and B denote scanning lines located horizontally immediately before and after a scanning line X not transmitted and at the same position on the line X. In the above ACTV system mentioned above, as shown in FIG. 3B, a signal $(X-(A+B)/2)$ is transmitted as a sequential scanning auxiliary signal Y. On the receiver side, as shown in FIG. 3C, the scanning line X $(=Y+(A+B)/2)$ not transmitter is reproduced on the basis of the transmitted scanning lines A and B and auxiliary signal Y.

FIGS. 4A to 4C show another method of reproducing a scanning line not transmitted. More specifically, FIG. 4A shows a positional relation between main scanning line signals to be transmitted and FIG. 4B shows a positional relation between sequential scanning auxiliary signals. In FIG. 4A, reference symbols C and D denote scanning lines located vertically immediately before and after a scanning line X not transmitted and in the same field. As shown in FIG. 4B, a signal $(X-(C+D)/2)$ is transmitted as a sequential scanning auxiliary signal Y. In the receiver side, on the other hand, as shown in FIG. 4C, the scanning line X $(=Y+(C+D)/2)$ not transmitted is reproduced on the basis of the transmitted scanning lines C and D and auxiliary signal Y.

Accordingly, with respect to a frequency band used to transmit the sequential scanning auxiliary signal, the original sequential scanning line signal can be reproduced on the receiver side without any deterioration.

If the sequential scanning auxiliary signal corresponding the same frequency band width as the main scanning line signal can be transmitted as by utilizing a plurality of channels, then there occurs no problem. However, when the number of idle channels is small, both the main scanning line signal and sequential scanning auxiliary signal must be transmitted on one channel.

In such an ACTV system as mentioned above, as shown in FIG. 5A, a carrier orthogonal (different in phase by 90 degrees from) to a video carrier for modulation of the main scanning line signal is used to modulate the sequential scanning auxiliary signal for one-channel transmission. This method, however, permits the transmission of the sequential scanning auxiliary signal having a frequency band of only about 1 MHz.

There is another method of masking parts of a screen with black belts and unnoticeably multiplexing the auxiliary signal in the mask parts as shown in FIG. 5B. This method, however, essentially disables enlargement of the mask parts and thus requires the auxiliary signal to be transmitted with its frequency band limited to about ⅓ to 1/55.

In the prior art ACTV system of FIG. 2, the sequential scanning auxiliary signal with its limited frequency band of 750 kHz and the main scanning line signal with its full frequency band are subjected to a scanning line interpolation in such a manner as shown in FIG. 3. For this reason, for signals having frequency above 750 kHz, an interframe average (Y=(A+B)/2) is output as an interpolated scanning line so that the time resolution drops and the moving picture blurs undesirably. When the scanning line interpolation is carried out in such a manner as shown in FIG. 4, an inter-scanning line average (Y=(C+D)/2) is output for the high frequency zone of the interpolated scanning line, thus resulting in that the vertical resolution drops.

SUMMARY OF THE INVENTION

It is an object of the present invention to provide a scanning line interpolation circuit in which a drop in the resolution is small even with respect to a frequency band used to pass a sequential scanning auxiliary signal.

The above object is attained by providing a scanning line interpolation circuit which comprises an auxiliary scanning line reproduction circuit for generating an auxiliary scanning line signal on the basis of a main scanning line signal and a sequential scanning auxiliary signal both transmitted, a first filter for limiting a frequency band of the auxiliary scanning line signal to set substantially equal to a frequency band of the transmitted sequential scanning auxiliary signal, a motion detection circuit for detecting a motion in a picture on the basis of the transmitted signals and outputting a motion amount k, a motion-adaptive scanning line interpolation circuit for receiving the main scanning line signal and performing interpolation processing according to the motion amount k, a second filter for limiting a frequency band of an output of the motion-adaptive scanning-line interpolation circuit complementarily to the first filter, and means for mixing outputs of the first and second filters to generate an interpolated scanning line output.

First, an auxiliary scanning line reproduction circuit is used to generate an auxiliary scanning line signal in such a manner as shown in FIGS. 3 or 4 on the basis of the transmitted main scanning line signal and sequential scanning auxiliary signal. Among the auxiliary scanning line signals, ones belonging to the frequency band used to pass the sequential scanning auxiliary signal can be correctly reproduced to the original scanning lines not transmitted for interlaced scanning. However, as mentioned above, the other signals belong to the frequency band used not to pass the sequential scanning auxiliary signal are deteriorated in the time or vertical resolution, so that the first filter is used to extract only the auxiliary scanning line signals belonging to the frequency band allowing correct reconstruction Meanwhile, the motion-adaptive scanning-line interpolation circuit is provided to reproduce a scanning line not transmitted for interlaced scanning on the basis of only the transmitted main scanning line signals. To this end, the motion detection circuit is used to detect motion in a picture as a motion amount k and to change over the scanning-line interpolation method based on the motion parameter k. The motion amount k is considered to be in the form of the size (degree) of the motion, a vector or the like. The motion-adaptive scanning-line interpolation circuit reproduces a scanning line not transmitted through interpolation on the basis of the motion amount k. For example, when the picture is still, a scanning line is reproduced through interpolation on the basis of fields horizontally immediately before and after the associated field as shown in FIG. 3C. In this case, the vertical resolution necessary for the still picture cannot be reduced at all. When the picture is moving to a large extent, on the other hand, the use of the method of FIG. 3C results in that a reproduced picture is doubled. To avoid this, the interpolation is carried out on the basis of vertically upper and lower scanning lines as shown in FIG. 4C. In this case, the time resolution necessary for the moving picture cannot be reduced at all. When the picture is slightly moving, an intermediate method between the above methods is employed to reproduce a scanning line through interpolation. An output of the motion-adaptive scanning-line interpolation circuit is passed through the second filter to extract only components belonging to a frequency band (used not to pass the sequential scanning auxiliary signal) complementary to that of the aforementioned first filter.

The above object is attained by mixing outputs of the first and second filters to reproduce an interpolated scanning line.

The above object is also attained by the means for limiting the frequency band of the interpolated scanning line signal to be substantially equal to that of the transmitted sequential scanning auxiliary signal.

First, an interpolated scanning line reproduction circuit is used to generate an interpolated scanning line signal in such a manner as shown in FIGS. 3 or 4 on the basis of the transmitted main scanning line signal and sequential scanning auxiliary signal. Among the auxiliary scanning line signals, ones belonging to the frequency band used to pass the sequential scanning auxiliary signal can be correctly reproduced to the original scanning lines not transmitted for interlaced scanning. However, as mentioned above, the other signals belong to the frequency band used not to pass the sequential scanning auxiliary signal are deteriorated in the time or vertical resolution, so that the filter is used to extract only the auxiliary scanning line signals belonging to the frequency band (e.g., horizontal low frequency components) allowing correct reconstruction.

Meanwhile, with respect to the frequency band not allowing correct reconstruction (e.g., horizontal high frequency components), such interpolation processing as in the prior art is not carried out and interlaced scanning is carried out as it is. In this case, the aliasing distortion of vertical-time frequency caused by interlaced scanning cannot be eliminated as in the prior art, but the original components will not be also eliminated due to the correct interpolation, which results in that the picture quality can be eventually improved and the above object can be attained.

BRIEF DESCRIPTION OF THE DRAWINGS

FIG. 1 is an arrangement of an embodiment of the present invention;

FIG. 2 is an arrangement of a prior art;

FIGS. 3A to 3C and 4A to 4C show different methods of generating a scanning line not transmitted on the basis of transmitted signals respectively;

FIGS. 5A and 5B show different methods of transmitting an auxiliary signal;

FIG. 7 is a diagram for explaining a positional relation between scanning lines;

FIG. 8 is an exemplary arrangement of a motion detection circuit;

FIGS. 9 to 11 show different motion detection characteristics;

DESCRIPTION OF THE PREFERRED EMBODIMENTS

Figure 6:
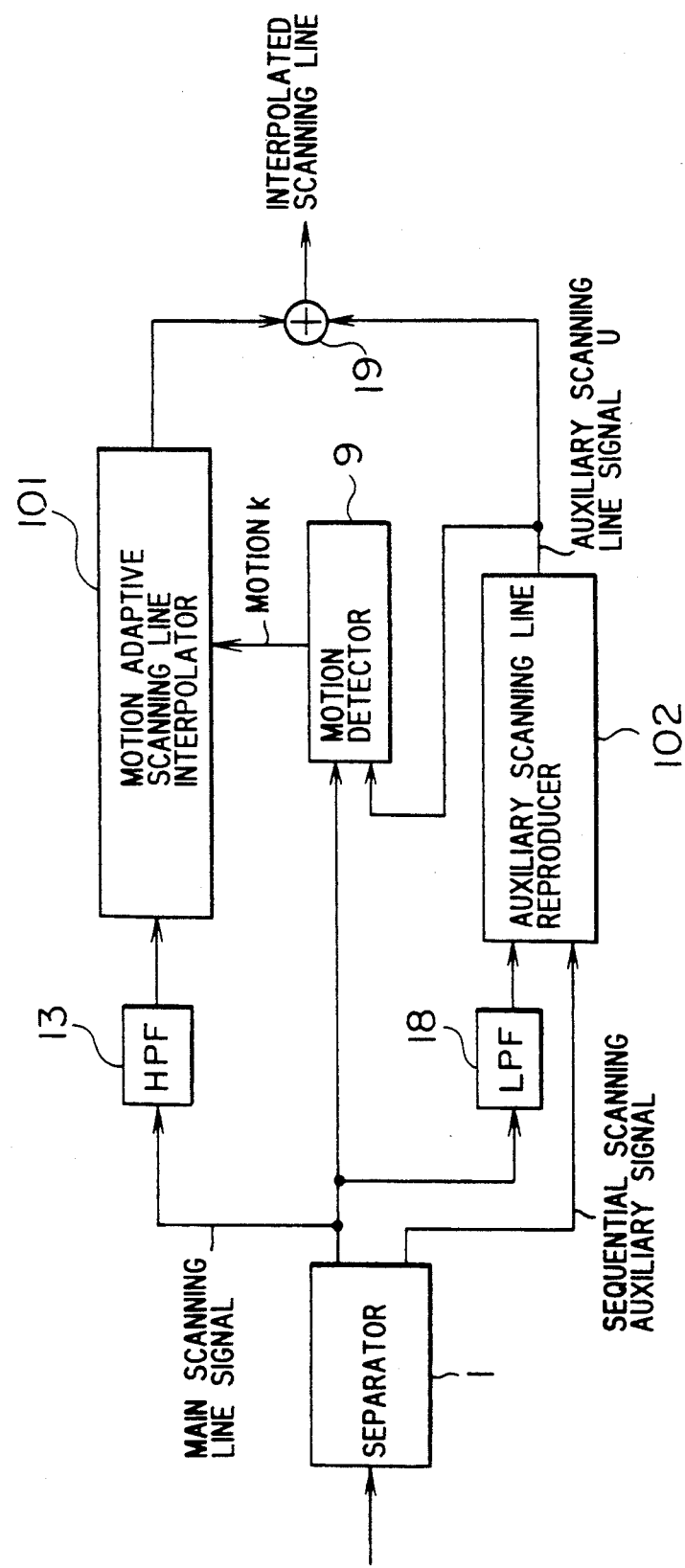
FIG. 6 is an arrangement of another embodiment of the present invention.

The present invention will be detailed by referring to the attached drawings.

Referring first to FIG. 1, there is shown a specific arrangement of an embodiment in accordance with the present invention, wherein a separation circuit 1 separates an input signal transmitted through a plurality of channels e.g., on such a 2-channel multiplex basis as shown in FIG. 5, into a main scanning line signal B and a sequential scanning auxiliary signal Y. These separated signals are sent to an auxiliary scanning line reproduction circuit 102 to generate an auxiliary scanning line signal therein. In FIG. 1, the auxiliary scanning line signal is generated, as an example, in such a manner as shown in FIG. 3. More specifically, the main scanning line signal B and a signal A corresponding to the signal B delayed by 525H (where H denotes a horizontal scanning period) through a delay circuit 14 are applied to an adder 15 to generate an addition signal $(A+B)$ and then the addition signal is supplied to a ½ multiplier 16 to generate an interframe average signal $((A+B)/2)$. The interframe average signal is next applied to an adder 17 together with the sequential scanning auxiliary signal Y to generate an auxiliary scanning line signal $X (=Y+(A+B)/2)$ that in turn is supplied to a first filter 18. The filter 18 functions to extract only that components of the received auxiliary scanning line signal X which have a frequency band through which the sequential scanning auxiliary signal has been transmitted. The main scanning line signal alone, on the other hand, is supplied to a motion-adaptive scanning-line interpolation circuit 101 to generate scanning lines by interpolation that has not been transmitted for interlaced scanning. In this connection, the motion of a picture is detected in the form of a motion k $(0 \leq k \leq 1)$ with use of a motion detecting circuit 9 to be explained later and the then scanning line interpolation method is changed over by using the motion k as a parameter. In the motion-adaptive scanning-line interpolation circuit 101, in more detail, the input main scanning line signal transmitted is first applied to an adder 7 together with a signal corresponding to the input main scanning line signal delayed by 525H through delay circuits 2, 3 and 4 and then applied to a ½ multiplier 8 to obtain an interfield interpolation value. At the same time, a first signal obtained by delaying the main scanning line signal through the delay circuit 2 and a second signal obtained by delaying further by 1H the first signal through the delay circuit 3 are applied to an adder 5 to obtain an addition signal that is then supplied to a ½ multiplier 6 to obtain an interline interpolation value. The aforementioned interfield interpolation value and interline interpolation value are multiplied respectively by $(1-k)$ and by k at respective multipliers 10 and 11 and then added together at an adder 12. An output of the adder 12 is sent to a second filter 13 having a frequency characteristic complementary to that of the first filter 18 to be subjected thereat with a band limitation; while an output of the second filter 13 and an output of the first filter 18 are added together in an adder 19 to obtain an interpolated scanning line signal. The delay circuits 2, 3 and 4, adder 7 and multiplier 8 of the motion-adaptive scanning-line interpolation circuit 101 as well as the delay circuit 14, adder 15 and multiplier 17 of the auxiliary scanning line reproduction circuit 102 can be commonly used, whereby the circuit size can be reduced. Further, when the auxiliary scanning line signal is reproduced in such a manner as shown in FIG. 4, the delay circuit 14 is required to provide a 1H delay.

FIG. 6 shows an arrangement of another embodiment of the present invention, wherein an input signal is separated at a separation circuit 1 into a main scanning line signal and a sequential scanning auxiliary signal and the main scanning line signal is passed through a first filter 18 to previously limit its frequency band to have substantially the same frequency band as that of the sequential scanning auxiliary signal and then applied to an auxiliary scanning line reproduction circuit 102 to obtain an auxiliary scanning line signal. The main scanning line signal, on the other hand, is passed through a second filter 13 having a characteristic complementary to that of the first filter 18 to be previously limited in its frequency band and then supplied to a motion-adaptive scanning-line interpolation circuit 101 for its scanning line interpolation. An output of the motion-adaptive scanning-line interpolation circuit 101 and an output of the auxiliary scanning line reproduction circuit 102 are added together at an adder 19 to obtain an interpolated scanning line. In the motion-adaptive scanning-line interpolation circuit 101, the interline and interfield interpolation values of the motion detector 9 are multiplied by outputs k and $(1-k)$ respectively.

Figure 11:
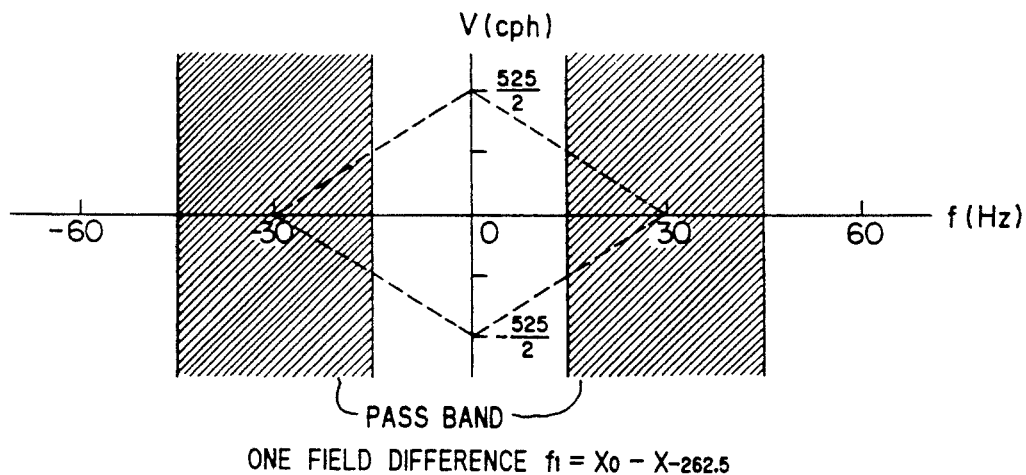

Shown in FIG. 7 is a scanning line positional relationship, wherein a black circuit ● denotes a transmitted main scanning line and a white circuit ○ denotes an interpolated scanning line. FIG. 8 shows a specific arrangement of the above motion detecting circuit 9. In the existing television system (NTSC system), since color signals subjected to a frame inversion and modulation are multiplexed in a high frequency region of a luminance signal, one frame difference in the main scanning line signal is detected at a one-frame difference detector 20 and then only low frequency components are extracted therefrom through a filter 21. A two-frame difference in the main scanning line signal is detected at a two-frame difference detector 22. Further, a difference between the main scanning line signal and auxiliary scanning line signal is detected at a one-field difference detector 23 and then is limited through a filter 24 to have the same frequency band as that of the transmitted sequential scanning auxiliary signal to obtain a one-field difference. The one-frame difference signal, two-frame difference signal and one-field difference signal are further mixed at a mixer 25 to obtain a motion k $(0 \leq k \leq 1)$. FIGS. 9, 10 and 11 show passage regions (or motion detection regions) of the above one-frame, two-frame and one-field difference signals respectively. When the transmitted sequential scanning auxiliary signal corresponds to such a field difference signal as shown in FIG. 3, it is unnecessary to send the auxiliary scanning line signal of the auxiliary scanning line reproduction circuit to the mixer 25 through the one-field difference detector 23 and filter 24 and the auxiliary scanning line signal can be sent directly to the mixer 25. The thus detected motion k may be also used not only for interpolation of scanning lines but also for separation of a signal transmitted on a multiplex basis (for example, for separation between luminance and color signals between accurate information).

Figure 12:
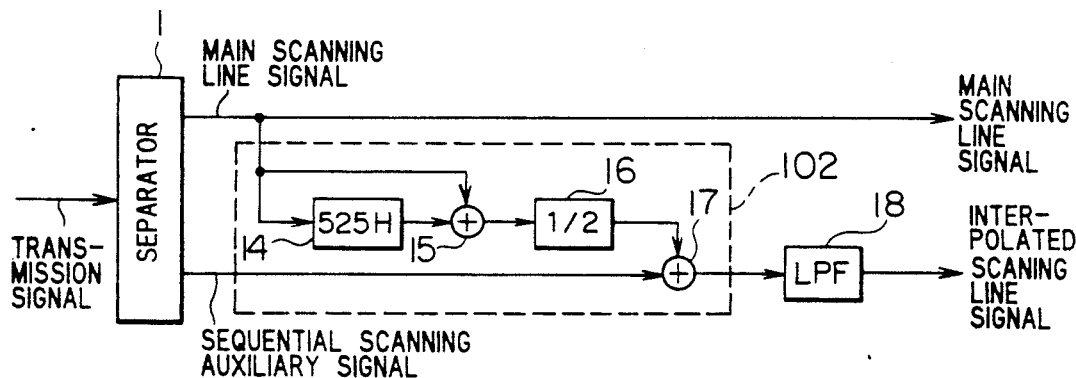
FIG. 12 is a block diagram of an arrangement of a scanning line interpolation circuit in accordance with a further embodiment of the present invention.

A further embodiment of the present invention is shown in the form of a specific arrangement in FIG. 12, wherein a separation circuit 1 separates an input signal transmitted through a plurality of channels, e.g., on such a one-channel multiplex basis as shown in FIG. 5, into a main scanning line signal and a sequential scanning auxiliary signal. These separated signals are sent to an auxiliary scanning line reproduction circuit 102 to generate an auxiliary scanning line signal therein. In this case, with respect to the frequency band in which the sequential scanning auxiliary signal is not transmitted, interlaced scanning is carried out as it is, and thus a filter 18 is provided to limit the frequency band of the interpolated scanning line signal to have the same frequency band as that of the sequential scanning auxiliary signal. In this connection, when the frequency band of the sequential scanning auxiliary signal is already limited at the separation circuit 1 at the transmitter or receiver side, the filter 18 is used to limit the frequency band of only the main scanning line signal prior to application to an adder 17.

Figure 13A:
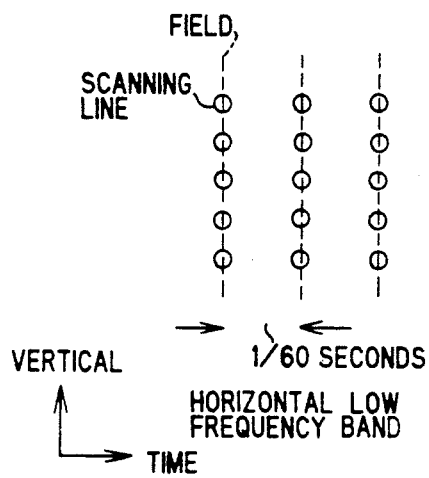
FIGS. 13A and 13B are diagrams for explaining the operation of the present invention.
Figure 13B:
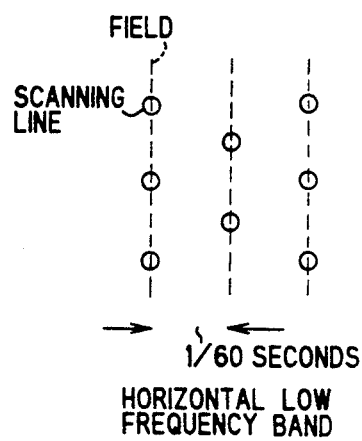

FIG. 13 shows the configuration of scanning lines of a reproduced picture. More in detail, FIG. 13A shows the configuration of scanning lines in a horizontal low frequency region of the picture in which the sequential scanning auxiliary signal is transmitted and wherein the scanning lines are accurately reproduced in a sequential scanning manner. FIG. 13B shows the configuration of scanning lines in a horizontal high frequency region of the picture in which the sequential scanning auxiliary signal is not transmitted and because only the main scanning line signal exists the scanning lines are reproduced in an interlaced scanning manner.

In the case of the interlaced scanning, signal power is reduced to half and thus that components (horizontal high frequency region components) of the main scanning line signal which are not subjected to an interpolation may be amplified to about twice to correct the frequency characteristic.

Further, in the case of still picture, since perfect interpolation can be carried out even by means of its conventional technique, it is also possible to use the present invention only in the case of a moving picture for motion adaptive switching.

Figure 14:
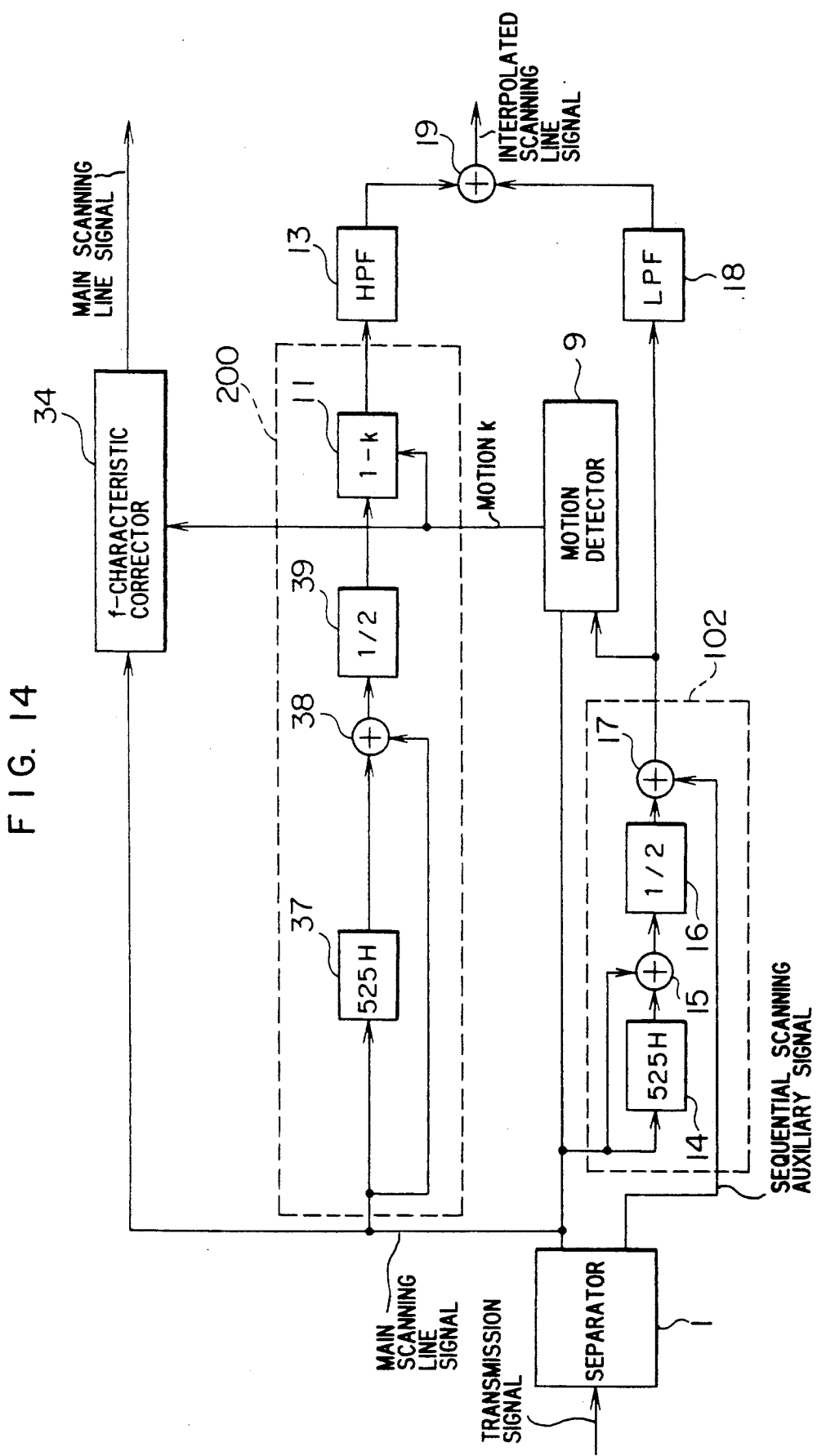
FIG. 14 is a block diagram of an arrangement of a scanning line interpolation circuit in accordance with yet another embodiment of the present invention.

Referring to FIG. 14, there is shown a detailed arrangement of yet another embodiment of the present invention in which the above is taken into consideration. More in detail, a separation circuit 1 separates a transmitted input signal into a main scanning line signal and a sequential scanning auxiliary signal. The same auxiliary scanning line reproduction circuit 102 as that shown in FIG. 12 is provided to generate an auxiliary scanning line signal on the basis of the received main scanning line signal and sequential scanning auxiliary signal. The auxiliary scanning line signal is then passed through a filter 18 to extract only accurately reproduced components (horizontal low frequency band components) therefrom. Meanwhile, the same motion detector 9 as in the foregoing embodiments is used to detect a picture motion k ($0 \leq k \leq 1$) from the transmitted signal and then send it to an interfield scanning line interpolation circuit 200 and also to a frequency characteristic correction circuit 34. In this case, for example, when the picture is still the motion k is set to be zero, when the picture is largely moving the motion is set to be 1, and when the picture is in an intermediate state between the still and moving state the motion is set to be $0 < k < 1$. The interfield scanning line interpolation circuit 200, which comprises a one-frame delay circuit 37, an adder 38, and multipliers 39 and 11, functions to generate an interpolated scanning line on the basis of only the main scanning line signal. In the illustrated example, the circuit 200 outputs a signal that is obtained by multiplying a frame average (i.e., $(A+B)/2$) by a motion coefficient $(1-k)$. More specifically, the interfield scanning line interpolation circuit 200 outputs a signal of $((A+B)/2)$ in the case of the still picture, and outputs a signal of "0" in the case of the largely moving picture. The output of the circuit 200 is passed through a filter 13 having a frequency characteristic complementary to that of the filter 18 to extract only horizontal high frequency components therefrom, and then applied to an adder 19 together with an outer of the filter 18 to obtain an interpolated scanning line signal. The main scanning line signal is also passed through a frequency characteristic correction circuit 34 (to be explained later) and then output. A common circuit may be employed for the auxiliary scanning line reproduction circuit 102 and interfield scanning line interpolation circuit 200 to realize the size reduction of the overall circuit. For example, the one-frame delays 14 and 37, the adders 15 and 38, and the multipliers 16 and 39 can be combined respectively as signal delay, adder and multiplier.

Figure 15:
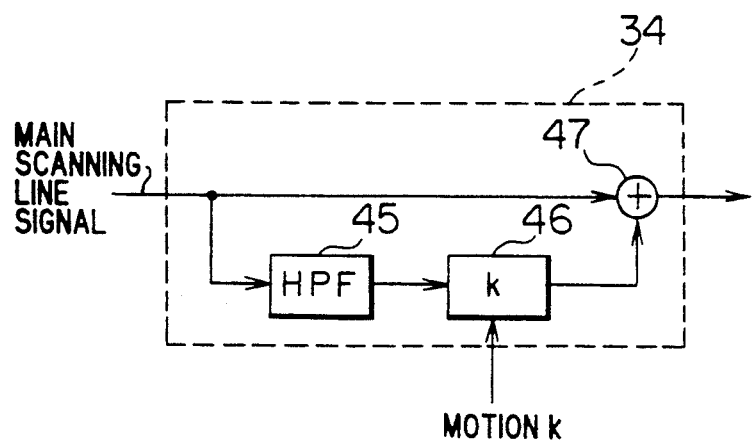
FIG. 15 is a block diagram showing an arrangement of a part of the circuit of the embodiment.
Figure 16:
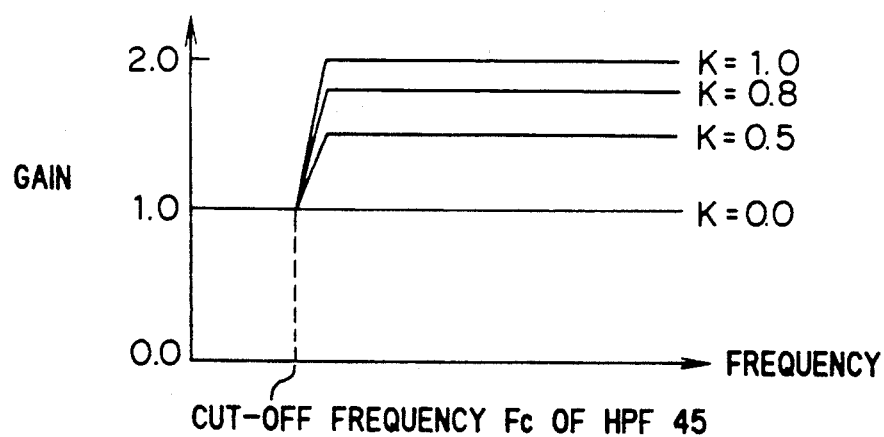
FIG. 16 is a characteristic diagram for explaining the operation of the circuit of the embodiment of the present invention.

Shown in FIG. 15 is an exemplary detailed arrangement of the above frequency characteristic correction circuit 34, in which a filter 45 passes the received main scanning line signal therethrough to extract frequency band components (e.g., horizontal high frequency components) from the main scanning line signal at which frequency band the sequential scanning auxiliary signal is not transmitted. An output of the filter 45 is then multiplied by a motion k ($0 \leq k \leq 1$) at a multiplier 46 and then applied to an adder 47 together with the original main scanning line signal to obtain an output of the frequency characteristic correction circuit 34. Explanation will be made as to the operation of the frequency characteristic correction circuit 34 by referring to FIG. 16. In a frequency zone lower than the cut-off frequency fc of the filter 45 (that is, in a frequency zone in which the sequential scanning auxiliary signal is transmitted), the gain is constant and 1.0 regardless of the motion k. In a frequency zone higher than the cut-off frequency fc, the gain varies from 1.0 to 2.0 depending on the motion k ($0 \leq k \leq 1$). In other words, in the motion mode, interlaced scanning is effected in the horizontal high frequency region so that, when signal power in the horizontal high frequency components of the main scanning line signal is increased to make the total power constant, deterioration in the picture quality caused by the attenuation of the high frequency components can be suppressed. Taking the gamma characteristic of the picture receiving tube into consideration, the gain k may be receiving tube into consideration, the gain k may be controlled depending on the level of the main scanning line or interpolated scanning line in response to the motion.

Although explanation has been made in connection with the average interpolation of adjacent scanning lines as the interfield scanning line interpolation and interline scanning line interpolation in the drawing for simplicity, the present invention is not limited to the particular example. For example, the number of tape may be further increased to improve the interpolation characteristic or previous-value interpolation (the value of the immediately-previous field or immediately-above scanning line is used as an interpolation value as it is) may be employed to realize the reduction of the circuit size though the performance somewhat drops. When it is possible to accurately obtain a motion vector, not the previous-value interpolation for the same position but the previous-value interpolation for a vector-corrected position may be employed.

In the case where the present invention is applied to the picture tube of a television receiver, it is not necessary to apply the present invention to all of luminance signal, color signals I and Q (or R-Y and B-Y), and red, green and (R, G and B) signals, but the invention may be only required to be applied only to the luminance signal Y providing a most effective improvement in the picture quality.

Further, the present invention may be used in a visually linear zone when consideration is paid to the visual characteristic. That is, after an input signal is once subjected to a none-linear processing $(y=in(x))$ using gamma inverse correction $(y=x^{2.2})$, the present invention may be applied to subject an output signal to an inverse processing $((x=y^{0.45})$ or $y=(exp(x))$.

The present invention may be modified in various ways, including the following.

(1) Even when it is desired not only to transmit signals but also to record the main scanning line signal and sequential scanning auxiliary signal to a video tape recorder (VTR), a video disk and so on, the present invention can be applied as it is.

(2) Even when the original signal includes not only a sequential scanning line signal (525 lines, 1:1) but also an interlace signal (1050 lines, 2:1 or 1125 lines, 2:1) as twice as the former, the invention can be similarly applied.

(3) When the absence of transmission of the auxiliary scanning line signal is detected on the basis of the presence or absence of a command or the like, the motion adaptive processing is applied even to the horizontal low frequency zone.

In accordance with the present invention, as disclosed in the foregoing, completely the original sequential scanning line signal can be obtained with respect to a frequency band for transmission of the sequential scanning auxiliary signal while complete scanning line interpolation for a still picture can e carried out and substantially the same level of picture quality as an existing interlace picture receiver tube for a moving picture can be realized with respect to the other frequency band. Since a scanning line interpolating method providing a least deterioration in the picture quality is selected, the picture quality can be improved to a large extent.

What is claimed is:

1. A scanning line interpolation circuit for reproducing scanning lines not transmitted due to interlaced scanning, comprising: first means for generating a first interpolated scanning line signal in response to a main scanning line signal and an auxiliary signal having a first frequency band, said first interpolated scanning line signal having a second frequency band, said second frequency band corresponding to said first frequency band, and second means for generating a second interpolated scanning line signal in response to picture motion, said second interpolated scanning line signal corresponding to the main scanning line signal and having a third frequency band, said second frequency band being the complement of said third frequency band within the frequency band of said main scanning line signal.

2. A scanning line interpolation circuit as set forth in claim 1, wherein said second means includes a motion detection circuit for detecting said picture motion and generating a motion value in response to both said main scanning line signal and said auxiliary signal.

3. A scanning line interpolation circuit for producing a scanning line signal not transmitted due to interlaced scanning, comprising: means for demultiplexing a main scanning line signal and an auxiliary signal indicating information on a scanning line not transmitted form a multiplexed transmission signal, and means for generating an interpolated scanning line signal including a first component corresponding to the main scanning line signal, a second component corresponding to a delayed value of the main scanning line signal and a third component corresponding to said auxiliary signal, said auxiliary signal having a first frequency band, said generation means including a filter for generating said interpolated scanning line signal, said interpolated scanning line signal having a second frequency band, said second frequency band corresponding to said first frequency band.

4. A scanning line interpolation circuit for reproducing a scanning line signal not transmitted due to interlaced scanning, including first means for generating a first interpolated scanning line signal in response to a main scanning line signal and an auxiliary signal, said auxiliary signal having a first frequency band, said first interpolated scanning line signal having a second frequency band, said second frequency band corresponding to said first frequency band of the auxiliary signal, and second means for generating a second interpolated scanning line signal, said second interpolated scanning line signal having a third frequency band, said second frequency band being the complement of the third frequency band within the frequency band of said main scanning line signal, said scanning line signal corresponding to previous and subsequent field information as a picture is still, said scanning line signal corresponding to said first and second interpolated scanning line signals as the motion of said picture is less than or equal to a predetermined value and said scanning line signal corresponding to no scanning line interpolation when said motion of said picture is above said predetermined value.

5. A sequential scanning circuit for producing a first main scanning line signal and an interpolated scanning line signal, said interpolated scanning line signal including a first interpolated scanning line signal and a second interpolated scanning line signal comprising: first means for generating said first interpolated scanning line signal, said first interpolated scanning line signal being responsive to a second main scanning line signal and an auxiliary signal, said auxiliary signal having a first frequency band, said first interpolated scanning line signal having a second frequency band, said second frequency band corresponding to said first frequency band of the auxiliary signal; second means for generating said second interpolated scanning line signal, said second interpolated scanning line signal corresponding to said second main scanning line signal and having a third frequency band, said third frequency band being the complement of said second frequency band; and third means for amplitude correcting said second main scanning line signal to generate the first main scanning line signal.

6. A scanning line interpolation circuit comprising: an auxiliary scanning line reproduction circuit for generating an auxiliary scanning line signal in response to a main scanning line signal and a sequential scanning auxiliary signal, a first filter for filtering said auxiliary scanning line signal to generate a first filter signal, said first filter having a first frequency band being substantially equal to a second frequency band of said sequential scanning auxiliary signal, a motion detection circuit for detecting a motion of a picture and generating a motion value in response to said main scanning line signal and said auxiliary scanning line signal, a motion-adaptive scanning-line interpolation circuit for receiving the main scanning line signal and performing interpolation processing corresponding to said motion value to generate a motion-adaptive signal, a second filter for filtering said motion-adaptive signal to generate a second filter signal, said second filter having a third frequency band complementarily to said first frequency band of said first filter, and means for mixing said first filter signal and said second filter signal to generate an interpolated scanning line signal.

7. A scanning line interpolation circuit comprising: an auxiliary scanning line reproduction circuit for receiving a first filter signal corresponding to a main scanning line signal transmitted through a first filter, said first filter generating said first filter signal having a firs frequency band, said first frequency band being substantially equal to a second frequency band of a sequential scanning auxiliary signal, said auxiliary scanning line reproduction circuit generating an auxiliary scanning line signal corresponding to said sequential scanning auxiliary signal and said first filter signal, a motion detection circuit for detecting motion of a picture in response to the main scanning line signal and said sequential scanning auxiliary signal and for generating a motion value, a motion-adaptive scanning-line interpolation circuit for receiving a second filter signal corresponding to the main scanning line signal transmitted through a second filter, said second filter generating said second filter signal having a third frequency band, said third frequency band being complementary to said first frequency band, and means for mixing outputs of said motion-adaptive scanning-line interpolation circuit and auxiliary scanning line reproduction circuit to generate an interpolated scanning line signal.

* * * * *